Patented Mar. 7, 1939

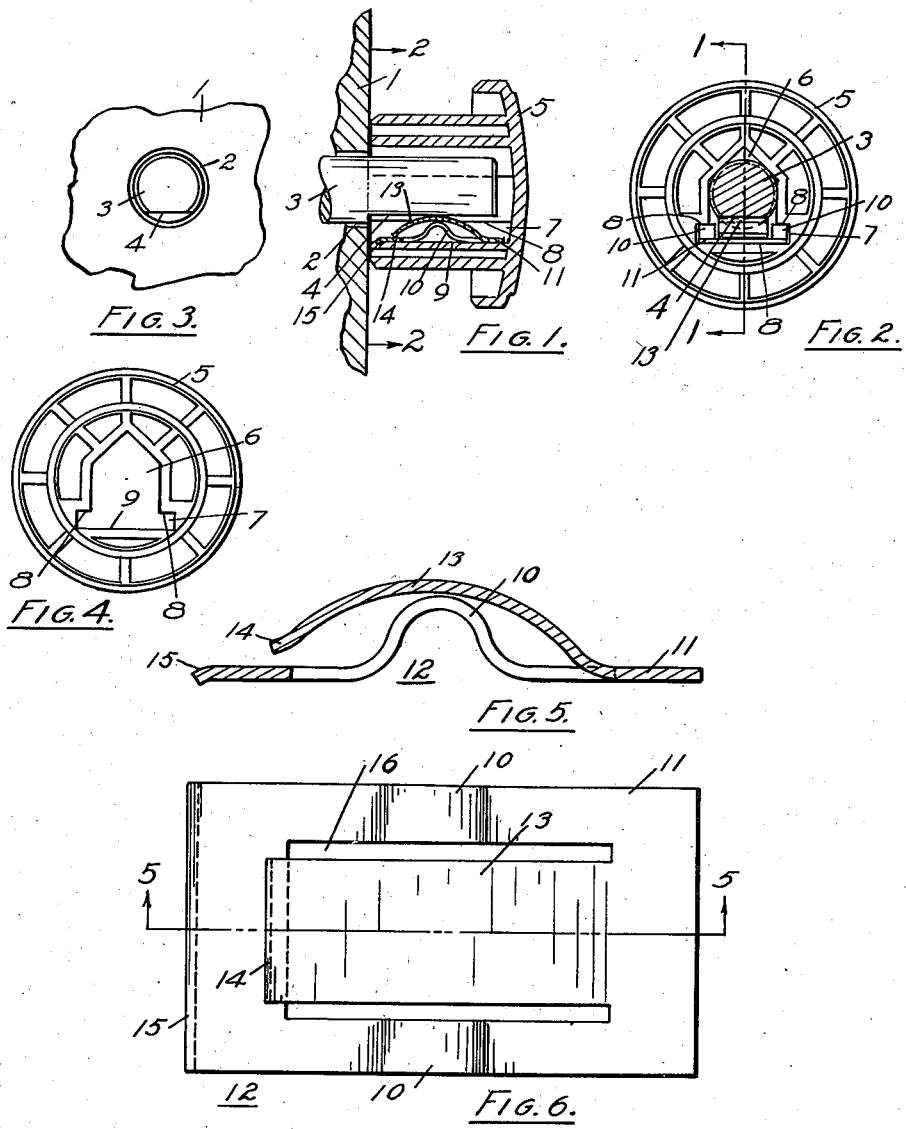

2,149,746

UNITED STATES PATENT OFFICE 2,149,746

SPRING ATTACHING MEANS

Julius T. Pfeiffer, Erie, Pa., assignor to Erie Resistor Corporation, Erie, Pa., a corporation of Pennsylvania Application April 14, 1937, Serial No. 136,901

5 Claims. (Cl. 287—53)

This invention relates generally to means for attaching articles to a shaft, and more particularly to spring means for securing knobs, handles, dials, and like articles to a shaft.

All devices of this character made according to the teachings of the prior art, and with which I am familiar, when used for securing knobs and like articles of a comparatively soft material, such as a thermal plastic material, to a shaft were very inefficient and impractical in that the attaching means would burrow into the soft material with the result that the knob became loose and fell from the shaft and the knob itself was destroyed for all practical purposes. These prior devices were difficult to assemble in the bore of the knob or like article and the high cost of manufacture and the comparatively short life of the knob wherein these prior devices were used made them impractical and uneconomical.

It is, accordingly, an object of my invention to overcome the above defects in spring attaching means for knobs, handles, dials, and like articles to be secured on a shaft and more particularly to provide a spring attaching means for simple assembly in a knob or like article which is simple in construction, easy to manufacture, cheap in cost, and efficient and economical in operation.

Another object of my invention is to provide spring attaching means for a knob, handle, dial, or like article to be attached to a shaft which secures the knob or like article against longitudinal and rotational movement on the shaft and which does not destroy the knob or like article by gouging into the article to be attached.

Another object of my invention is to provide a spring attaching means for a knob, handle, dial, or like article to be attached to a shaft which permits practically indefinite attachment and detachment of the knob or like article without destroying the spring attaching means or the knob or like article.

Other objects of my invention will become evident from the following detailed description, taken in conjunction with the accompanying drawing, in which Fig. 1 is a view taken on the line 1—1 of Fig. 2 showing a knob attached to a shaft by my novel spring attaching means.

Fig. 2 is a view taken on the line 2—2 of Fig. 1.

Fig. 3 is a fragmentary view showing the outwardly extending shaft upon which the knob is to be mounted.

Fig. 4 is an end view of the knob shown in Fig. 1.

Fig. 5 is a view taken on the line 5—5 of Fig. 6 showing my novel spring attaching means.

Fig. 6 is a plan view of my novel spring attaching means.

Referring to the drawing, Fig. 1 shows a wall or panel 1 having an aperture 2 through which extends a shaft 3 having a flat surface 4. A knob or handle 5 having a bore 6 for receiving the shaft 3 is preferably mounted on the shaft 3 as shown in Fig. 1. It will be evident that any form of knob, handle, dial, or like article having a bore for disposal on a shaft could be used instead of the knob 5 shown in Fig. 1 without departing from the spirit of the invention. An open channel 7 having opposing faces 8 and 9 is disposed adjacent the central bore 6 of the knob 5 and receives the raised bent portions 10 on the plate 11 of the spring attaching means 12. The raised portions 10 contact the upper face 8 of the open channel 7 and the bottom of the plate 11 contacts the lower face 9 of the channel 7 to securely hold the spring attaching means 12 in the channel 7 and adjacent the central bore 6 of the knob 5. An arcuate shaped tongue 13 having a long radius bend is disposed integral with the plate 11 and its free end 14 contacts the surface of the plate 11 when a downward force is exerted on the tongue 13. In other spring attaching means, the spring or tongue contacted the interior surface of the knob or handle to be mounted on the shaft with the result that the knob or handle was destroyed after coming loose and falling from the shaft upon which it was mounted because of the gouging or burrowing action of the free end of the tongue contacting the interior surface of the knob or handle. The outer edge 15 of the plate 11 is slightly bent in a downward direction to prevent the outward movement of the spring attaching means 12 after it is inserted into the open channel 7 in the knob 5.

In the manufacture of the spring attaching means 12, a U-shaped slot 16 is cut in the plate 11 and the tongue 13 comprising the central portion of the U-cut is bent upwardly away from the plate 11 in a long radius bend. Opposed raised bent portions 10 are then formed in the plate 11 to materially decrease the length of the plate 11 and to provide spring means to secure the spring attaching means 12 between the opposing faces 8 and 9 of the open channel 7. Because of the decreased length of the plate 11, the free end 14 of the tongue 13 rests on the surface of the plate 11 when a downward force is exerted on the tongue 13, as when it is placed in contact with the flat surface 4 on the shaft 3 as shown in Fig. 1.

In assembling the spring attaching means 12 in the open channel 7 in the knob 5, the raised bent portions 10 contact the upper face 8 of the open channel 7 and the bottom of the plate 11 contacts the lower face 9 of the open channel 7 to hold the spring attaching means 12 securely in the channel 7, the raised bent portions 10 of the plate 11 providing a spring action to exert a force on the faces 8 and 9 of the channel 7 and securely hold the spring attaching means 12 in the channel 7. The outer edge 15 of the plate 11 is slightly bent downwardly thereby preventing an outward movement of the knob 5 on the shaft 3. When the knob 5 is mounted on the shaft 3, the tongue 13 of the spring attaching means 12 contacts the flat surface 4 of the shaft 3 and the free end 14 of the tongue 13 is forced into contact with the surface of the plate 11 with the result that a strong force is exerted upon the flat surface 4 of the shaft 3 by the spring action of the tongue 13. The force exerted by the tongue 13 is of such proportions that the knob 5 is firmly held on the shaft 3 against both longitudinal and rotational movement. The attachment of the knob 5 on the shaft 3 causes the free end 14 of the tongue 13 to contact the surface of the plate 11 thereby preventing any wear on the interior of the knob 5 and permitting practically indefinite attachment and detachment of the knob without loss of efficiency in maintenance or deterioration.

It will be apparent from the foregoing description that I have provided a novel spring attaching means for a knob, handle, dial, or like article to be mounted on a shaft which does not gouge or burrow into the interior surface of the knob or like article, which is simple in construction and easily assembled, and which permits practically indefinite attachment and detachment of the knob or like article on the shaft upon which it is mounted without destroying the knob or the spring attaching means itself.

Applicant's invention was designed for use with knobs, handles, dials, or like articles made of a soft material, such as a thermal plastic material, although it will be apparent that any material may be used without departing from the spirit of the invention.

Various changes may be made in the specific embodiment of the present invention without departing from the spirit thereof, or within the scope of the appended claims.

What I claim is:

1. In an article to be mounted on a shaft, said article having a bore for receiving said shaft and an open channel adjacent thereto, a spring attaching means for contacting said shaft to secure said article against longitudinal and rotative movement but permitting manual attachment and detachment thereof on said shaft comprising a plate, raised portions on said plate for contacting the upper faces of said open channel to secure said spring attaching means in said article adjacent said bore, and a tongue extending upwardly from said plate to contact said shaft, the free end of said tongue being adapted to bear upon the surface of said plate when said article is mounted on said shaft.

2. In an article to be mounted on a shaft having a spring engaging surface, said article having a central bore for receiving said shaft and an aperture adjacent said bore, a spring attaching means for disposal in said aperture adjacent the central bore of said article comprising a plate, having a portion thereof cut out and struck out of the plane thereof to form a tongue extending upwardly and outwardly from said plate to contact the spring engaging surface on said shaft to secure said article on said shaft, said plate being deformed to shorten said plate whereby the free end of said tongue contacts and slides upon the surface of said plate when said tongue is forced thereagainst.

3. In an article to be mounted on a shaft having a surface for engaging a spring, said article having a central bore for receiving said shaft and an aperture adjacent said bore, spring attaching means comprising a plate, a tongue extending upwardly and outwardly from said plate to engage the spring engaging surface of said shaft to secure said article against longitudinal and rotative movement on said shaft but permitting manual attachment and detachment thereof on said shaft, and means on said plate for contacting surfaces of said aperture in said article to secure said spring attaching means in said aperture adjacent the bore of said article.

4. In an article to be assembled on a shaft having a spring engaging surface, said article having a bore for receiving said shaft and an aperture adjacent thereto, a spring attaching means for disposal in said aperture in said article comprising a plate, raised surfaces on said plate for contacting surfaces of said aperture in said article to secure said spring attaching means in said aperture adjacent the bore in said article for receiving said shaft, and a tongue member for contacting the spring engaging surface of said shaft to secure said article on said shaft but permitting the attachment and detachment thereof manually, the free end of said tongue being adapted to engage the surface of said plate when a sufficient downward force thereon is exerted.

5. In an article to be assembled on a shaft, a spring attaching means for engagement with said shaft for securing said article on said shaft comprising a plate having a portion thereof cut out and struck out of the plane thereof to form a tongue for engaging said shaft, said plate being deformed to shorten said plate whereby the free end of said tongue contacts and slides upon the surface of said plate when it is forced thereagainst.

JULIUS T. PFEIFFER.